United States Patent [19]

Shirai

[11] Patent Number: 4,736,661
[45] Date of Patent: Apr. 12, 1988

[54] CUTTING APPARATUS

[76] Inventor: Takaaki Shirai, 18-14, Ohhasukita 3-chome, Higashiosaka-shi, Osaka-fu, Japan

[21] Appl. No.: 909,953

[22] Filed: Sep. 22, 1986

[51] Int. Cl.[4] .............................................. B26D 3/08
[52] U.S. Cl. ...................................... 83/882; 33/32.3; 33/41.1; 83/71; 83/883; 83/646
[58] Field of Search ................. 83/879, 880, 883, 884, 83/886, 882, 425, 480, 646; 33/18.1, 21.1, 32.1, 32.2, 41.1, 41.4

[56] References Cited

U.S. PATENT DOCUMENTS

| | | | |
|---|---|---|---|
| 3,673,900 | 7/1972 | Jendrisak et al. | 83/884 |
| 4,044,639 | 8/1977 | Kato | 83/71 X |
| 4,187,755 | 2/1980 | Shirai | 83/882 |
| 4,221,150 | 9/1980 | Bergfelt et al. | 83/882 |
| 4,291,824 | 9/1981 | Detorre | 83/884 X |
| 4,519,139 | 5/1985 | Ghinamo | 33/32 C |

*Primary Examiner*—E. R. Kazenske
*Assistant Examiner*—Hien H. Phan
*Attorney, Agent, or Firm*—Wenderoth, Lind & Ponack

[57] ABSTRACT

A cutting apparatus for cutting material into a desired shape has a first travelling member and a second travelling member which are arranged on a holding stand, on which the material to be cut is placed, and which approach and separate from each other. A cutting tool for cutting the material is mounted on each of the first and the second travelling members so as to be movable in a direction that is perpendicular to the travelling direction of each travelling member. Movement corresponding to a cutting profile required for the cutting tool to cut the material to a desired shape is imparted by controlling the first travelling member and the second travelling member and the cutting tools mounted on both travelling members. In addition, such a cutting process can be carried out by driving a numerical control to spread the cutting tools mounted on both travelling members in a laterally symmetrical relation so that an annular portion can be cut to produce shaped articles.

6 Claims, 4 Drawing Sheets

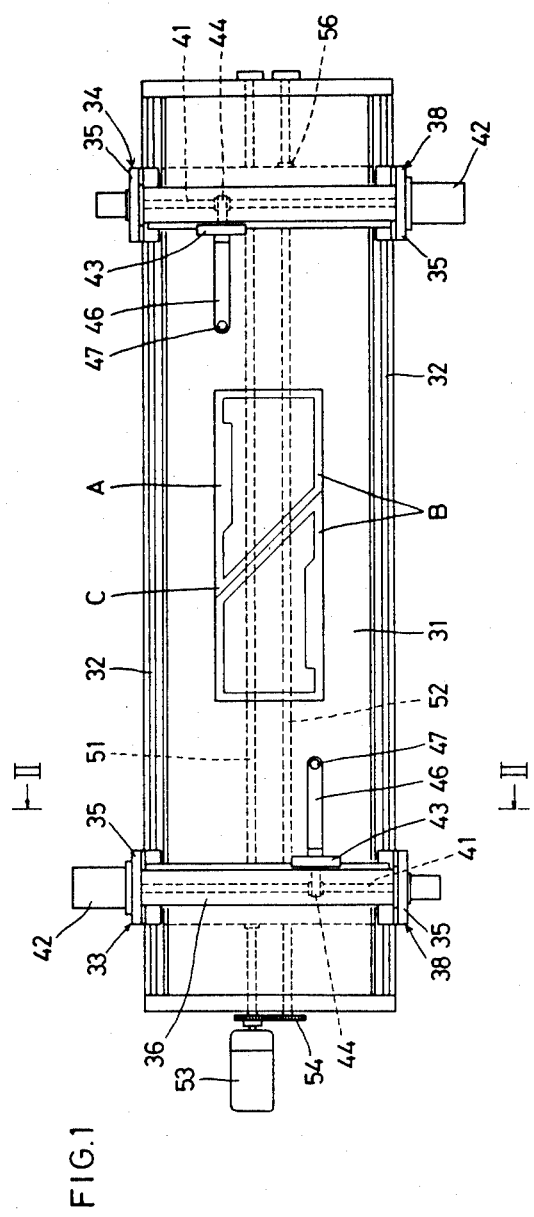
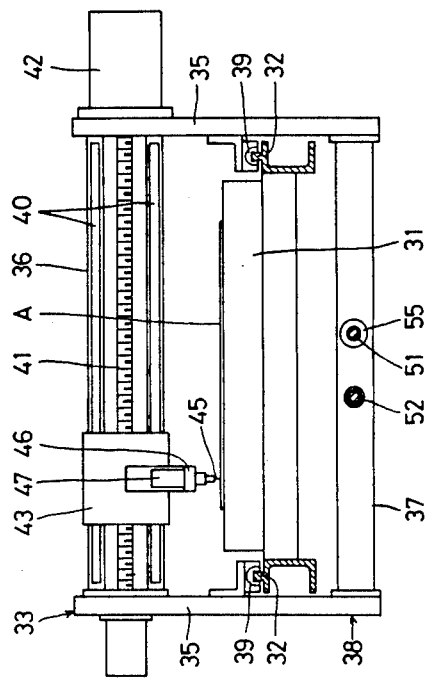
FIG.1
FIG.2

CUTTING APPARATUS

BACKGROUND OF THE INVENTION

1. Field of the Invention

The present invention relates to a cutting apparatus, in particular to a cutting apparatus for automatically cutting material into a desired shape, in which a cutting process can be carried out by spreading a first travelling member, a second travelling member and cutting tools mounted on both travelling members in a laterally symmetrical relation, whereby an annular portion can be cut.

2. Description of the Related Art

In various fields a general method, in which parts and articles having a desired shape are cut by a cutting method from a slightly larger material, has been carried out. For example, in the case where shaped window glass used in cars is manufactured, the above described general cutting method has been adopted.

FIGS. 9 to 12 show a cutting process for obtaining the above described shaped window glass used in cars as one example in which a rectangular plate glass 21, having a size large enough to be cut into out two pieces of window glass, is prepared.

At first, as shown in FIG. 9, an inclined cutting line 22 for cutting the rectangular plate glass 21 into two parts is marked on the rectangular plate glass 21, and then the rectangular plate glass 21 is cut into two half pieces 23, 23, as shown in FIG. 10.

Subsequently, as shown in FIG. 11, a cutting line 24 having a profile coinciding with a shape of a deformed window glass is marked on the half piece 23 and a deformed window glass as shown in FIG. 12 is obtained by cutting the rectangular plate glass 21 along the cutting line 24.

As a general method of cutting, a die-profiling method is known in which a die having a shape equal to a finished shape is prepared and a cutting tool is guided along the profile of this die, and according to this method the cutting tool is manually operated to carry out the cutting of the above described shaped window glass.

In the former die-profiling method disadvantages lie in the fact that a die corresponding to a shape to be cut must be prepared every time and the work associated therewith is expensive.

In addition, in the manual cutting method problems have occurred in that the working efficiency is low, the working accuracy is low, and the mass production can not carried out, whereby increased costs are realized. Furthermore, if a profile line is formed in a large plate glass by means of a plurality of cutters at once, the yield is reduced, whereby again, an increase in cost of the product is realized.

Besides, in a cutting method of articles other than the above described window glass, the similar cutting method as above described has been adopted and the similar problems have occurred.

SUMMARY OF THE INVENTION

Thus, it is a first object of the present invention to provide a cutting apparatus, in which a cutting process can be carried out by spreading a first travelling member, a second travelling member and cutting tools mounted on said both travelling members in a laterally symmetrical relation and a numerically controlled drive for the travelling member and cutting tools.

It is a second object of the present invention to provide a cutting apparatus, in which a cutting process for cutting complicated shapes can be efficiently and automatically carried out by using a die and mass production and power-saving can be achieved, thereby reducing the cost of products.

It is a third object of the present invention to provide a cutting apparatus capable of obtaining a superior product in due to the high degree of cutting accuracy at which it is cut.

It is a fourth object of the present invention to provide a cutting apparatus in which a plurality of cuts can be simultaneously carried out and mass production can be achieved.

The above and other objects and features of the invention will appear more fully hereinafter from a consideration of the following description taken in connection with the accompanying drawing wherein preferred embodiments are illustrated by way of example.

BRIEF DESCRIPTION OF THE DRAWINGS

FIG. 1 is a plan view showing a first embodiment of a cutting apparatus according to the present invention;

FIG. 2 is a longitudinal sectional view of FIG. 1 taken along a line II—II thereof;

Figure 3:
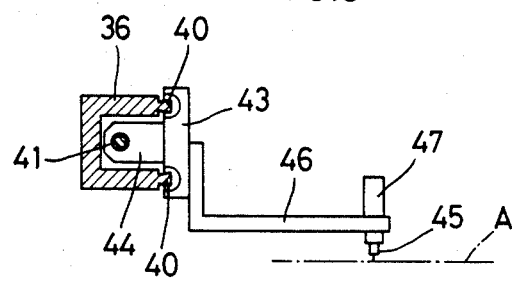
FIG. 3 is a longitudinally sectioned front view showing a cutting tool-mounting portion as shown in FIG. 1.
Figure 4:
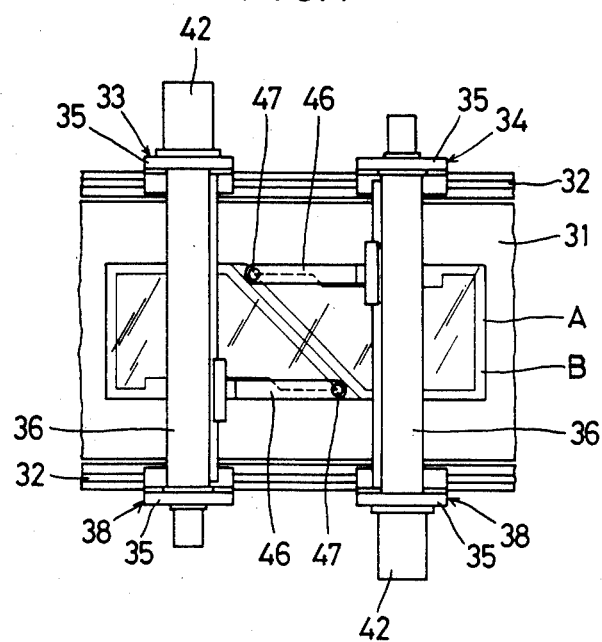
FIG. 4 is a plan view showing a state of the cutting tool midway through the cutting process.
Figure 5:
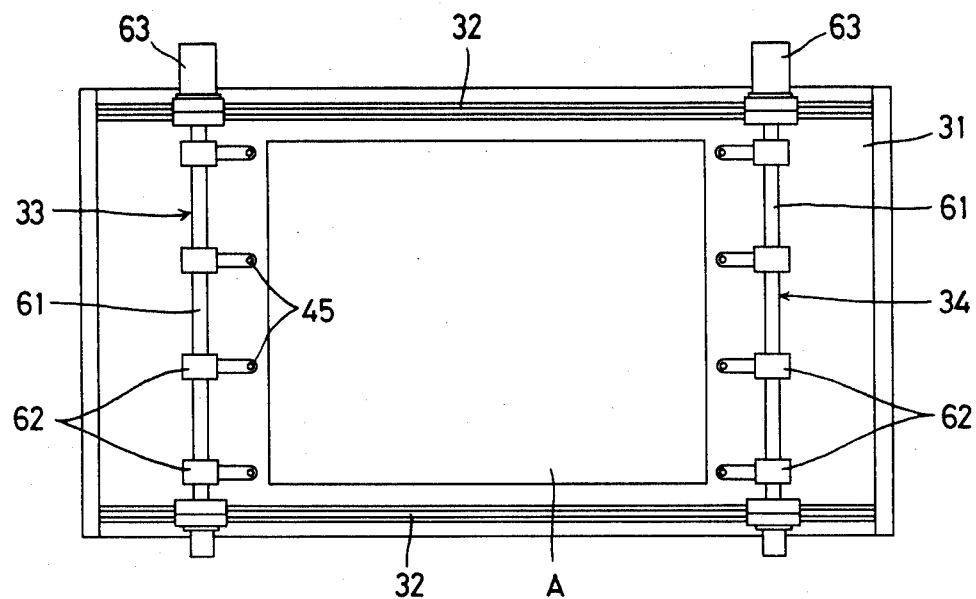
FIG. 5 is a plan view showing a second embodiment of a cutting apparatus according to the present invention for simultaneously cutting of a plurality of flat plates.

In the first embodiment as shown in FIGS. 1 to 4 a supporting stand 31 for horizontally supporting a material to be cut A thereon has a laterally lengthened rectangular shape and guide rails 32, 32 extend in parallel on both longitudinal sides of an upper surface of said supporting stand 31.

A first travelling member 33 and a second travelling member 34, which are supported by said guide rails 32, 32 so as to be movable along said rails 32, 32 in the longitudinal direction of the supporting stand 31, are arranged on the supporting stand 31.

At first, the first travelling member 33 is adapted so that a horizontal member 36 extends above and between a pair of side plates 35, 35 facing each other across the width of the supporting stand 31 so as to be positioned directly above the supporting stand 31; a cross beam 37 extends below the supporting stand 31 between the lower ends of the side plates 35, 35 to assemble a frame 38; travelling members 39, 39, which are provided midway on opposite surfaces of both side plates 35, 35, are placed on the rails 32, 32; and the frame 38 is supported by the rails 32, 32 so as to be movable in the longitudinal direction of the supporting stand 31, as shown in FIG. 2.

The frame 38 of said first travelling member 33 is provided with a pair of rails 40 spaced apart vertically up and extending in the longitudinal direction of the horizontal member 36 on one side of the horizontal member 36, a rotatable means 41 extending in the longitudinal direction of the horizontal member 36, a motor 42 for rotating the screw means in normal and opposite directions, a travelling stand movable along the rails 40 of the horizontal member 36, a nut member 44 threaded on the screw means 41 and a cutting tool 45 fixedly mounted on the travelling stand 43, as shown in FIG. 3.

Accordingly, upon rotating the screw axis 41 by starting the motor 42, the travelling stand 43 and the cutting tool 45 mounted on the travelling stand 43 travel on the supporting stand 31 in the longitudinal direction of the horizontal member 36, that is to say a direction extending at right angles to the travelling direction of the first travelling member 33.

In mounting the cutting tool on said travelling stand 43, as shown in FIG. 3, an L-shaped arm 46 is fixedly mounted on the travelling stand 43, said arm 46 being provided with a cylinder 47 at a horizontal pointed end thereof, a downwardly extending piston rod of said cylinder 57 being provided with the cutting tool 45 at a pointed end thereof, the position of the cutting tool 45 relative to the material to be cut A on the supporting stand 31 being adjustable in height.

In addition, it is preferable to adopt a rolling ball construction for a travelling portion against each rail so that the travel of the first travelling member 33 along the guide rails 32, 32 and the travel of the travelling stand 43 along the rails 40 may be smoothly achieved.

Next, the second travelling member 34 has a construction the same as that of said first travelling member 33 and also parts mounted on the second travelling member 34 equivalent to those mounted on the first travelling member 33, so that the description will be omitted and parts of the second travelling member 34 equal to those of the first travelling member 33 are referenced in the same manner as are those of the first travelling member 33.

As shown in FIG. 1, the first travelling member 33 and the second travelling member 34 are arranged on the supporting stand 31 so that the cutting tools 45 project toward each other.

Two screw means 51, 52 are arranged in parallel and extend in the longitudinal direction in the lower portion of said supporting stand 31 so that one of said screw means 51, 52 may be driven by means of a motor 53 and both screw means 51, 52 may be interlocked so as to rotate in an opposite direction to each other by means of a pair of gears 54 which are engaged with each other.

A nut member 55 mounted on the cross beam 37 of the first travelling member 33 is threaded to one screw means 51 while a nut member 56 mounted on the cross beam 37 of the second travelling member 34 is threaded to the other screw means 52.

Accordingly, upon starting the motor 53 to rotate said both screw means 51, 52 in the directions opposite to each other, the first travelling member 33 and the second travelling member 34 either approach each other or are separated from each other on the supporting stand 31.

In addition, said both screw means 51, 52 may be driven by means of separate motors.

The motor 43 for translating said first travelling member 33 and second travelling member 34 and the motors 42, 42 for translating the cutting tools mounted on said both travelling members 33, 34 are controlled in accordance with information previously input in the control device, a longitudinal movement and a lateral movement relative to the supporting stand 31 being given to the cutting tools 45, 45 solely or in synthesis, and the cutting tools 45, 45 travelling in directions corresponding to the profile of the article to be obtained when cutting the material to be cut A.

Furthermore, although the control device is not shown, the movement of the cutting tools 45, 45 is directed in accordance with numerical information recorded on a paper tape, a magnetic tape or the like, and as a result, the cutting tool 45 can translate in any direction to cut by the combination of the movement of the travelling members and the movement of the travelling stand 43.

Furthermore, although the supporting stand 31 for placing the material to be cut A has merely a table-like structure in this embodiment, a construction, using for example a conveyor, may be adopted to automatically carry out the supply of the material to be cut A at a stationary position and to carry out the delivery of cut articles.

This first embodiment of the present invention has the above described construction. The cutting method is described with reference to window glass fabricated from a plate glass.

When cutting the plate glass, glass cutters and diamond are used as the cutting tools 45, 45 of the first travelling member 33 and the second travelling member 34, the plate glass has a size large enough for two pieces of shaped window glass to be obtained to be placed at the stationary position of the supporting stand 31, the motor 53 is started up by the control device to rotate both screw means 51, 52, whereby the first travelling member 33 and the second travelling member 34 approach each other, and upon the arrival of the cutting tools 45, 45 at cutting start-up points which exist at diagonal positions of the plate glass, the cylinder 47 is actuated to press the cutting tools 45, 45 against the plate glass.

Under this condition, the motors 53, 42, 42 are each controlled on the basis of the order from an control device to translate the cutting tools 45, 45 along a locus equal to the profile of the window glass by combined movement of the of the first travelling member 33 and the second travelling member 34 and the movement of the travelling stand 43, 43 along the horizontal members 36, 36, whereby a pair of cutting lines B are marked on the plate glass.

Upon completely marking the cutting lines B, as shown in FIG. 1, the first travelling member 33 and the second travelling member 34 retreat to the separated positions. For simultaneously obtaining two pieces of shaped window glass it is only necessary to remove window glasses out of the plate glass on the supporting stand 31 by cracking.

In addition, the plate glass a shown in FIG. 1 has two cutting lines C for cracking at a center thereof.

Next, in the second embodiment as shown in FIGS. 5 to 8 a plurality of sheets of plate glass can be simultaneously cut. The description of the same parts as in the first embodiment as shown in FIGS. 1 to 4 is omitted and corresponding parts are referred to in the same manner.

Referring to FIGS. 5 to 8, in the first travelling member 33 and the second travelling member 34 arranged on the supporting stand 31, a ball screw means 61 is used in place of the horizontal member 36 in the first embodiment, said ball screw means 61 being provided with a plurality of cutting tool-fixing holders 62, and said holders 62 translated simultaneously by the rotation of the ball screw means 61 by means of a motor 63.

Figure 7:
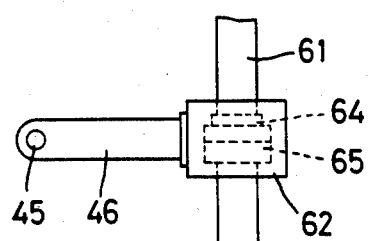
FIG. 7 is an enlarged plan view showing the cutting tool in the cutting apparatus as shown in FIG. 5.

Each of the holders 62 is provided with a cutting tool 45. In order to automatically position the holder 62 relatively to the ball screw means 61, as shown in FIG. 7, a clutch 65 is connected to a nut member 64 engaged with the ball screw means 61, and the clutch 65 is actuated to individually position the holders 62. However, the holders 62 may be manually positioned.

Figure 6:
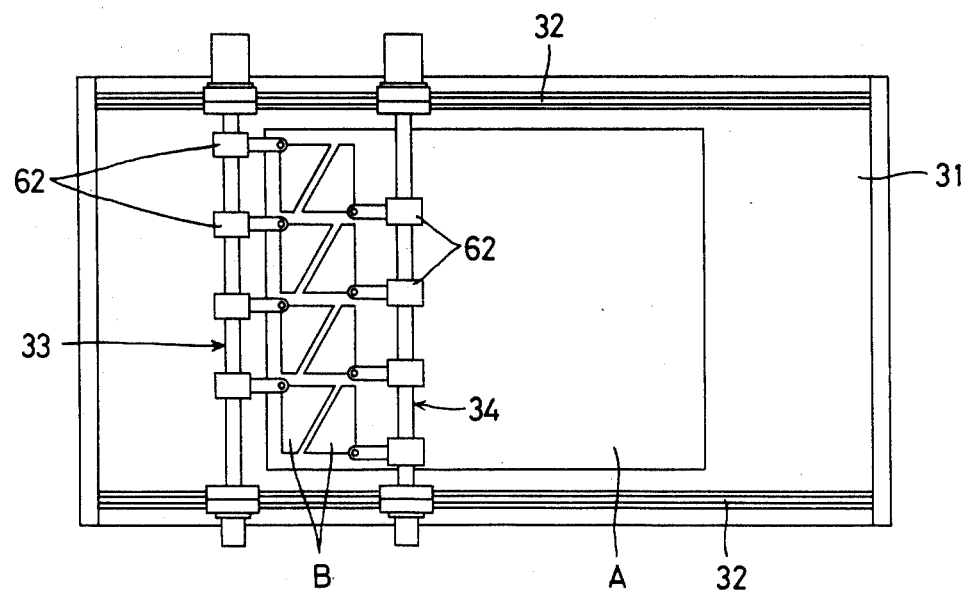
FIG. 6 is a plan view showing a state of the cutting apparatus as shown in FIG. 5 midway through the cutting process.
Figure 8:
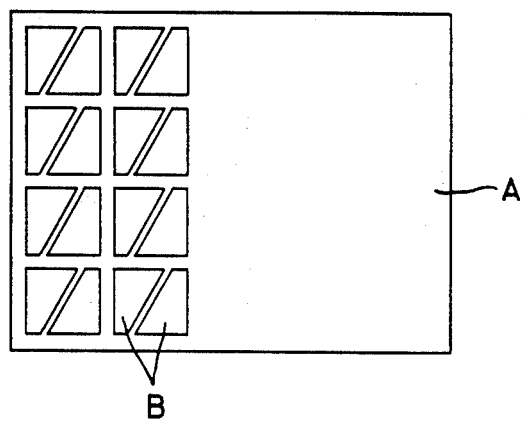
FIG. 8 is a plan view showing a state of the flat plate midway through the cutting process as shown in FIG. 5.
Figure 9:
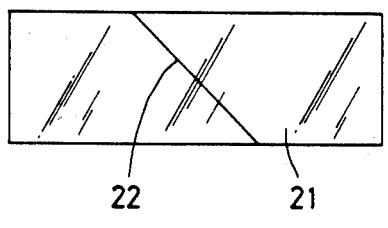
FIGS. 9 to 12 are plan views showing operations of cutting window glass in sequence.
Figure 11:
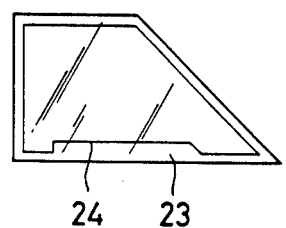
Figure 10:
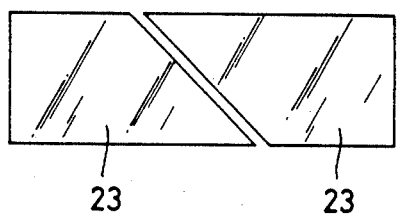
Figure 12:
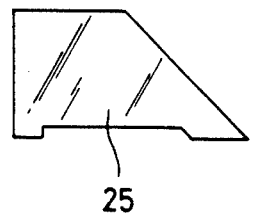

In this embodiment of the present invention having the above described construction, the first travelling member 33 and the second travelling member 34 are positioned on a material to be cut A placed on the supporting stand 31, each motor being controlled by the order of the control device, whereby the cutting tool 45 mounted on each holder 62 is translated along a locus equal to the profile of an article to be obtained by the travel of the first travelling member 33 and the second travelling member 34 and the travel of the holder 62 along the ball screw means 61 which simultaneously marks a plurality of cutting lines having an equal shape, shown in FIG. 6. A large number of cutting lines can be marked on the material to be cut A side by side by shifting the cutting positions of the first travelling member 33 and the second travelling member 34 in turn, as shown in FIG. 8.

Furthermore, in either the first embodiment or the second embodiment the material to be cut is not limited to the illustrated plate glass but various kinds of material can be cut appropriately by selecting a kind of cutting tool 45. It may be said in this connection that there is a following relation between the material to be cut and the cutting tool:

| Material to be cut | Kind of cutting tools |
|---|---|
| Plate glass | Cutter, Diamond |
| Iron plate | Torch |
| Resin plate | High-pressure water spray nozzle |
| Paper (Laminated paper) | Cutter, Laser beam |
| Cloth (Laminated cloth) | High-pressure water spray nozzle, Laser beam |

As described above, with a cutting apparatus according to the present invention, the cutting process can be carried out by driving a numerical control to spread a first travelling member, a second travelling member and cutting tools mounted on the first travelling member and the second travelling member in a laterally symmetrical relation, whereby an annular portion can be cut, to produce a shaped article so that efficiency is remarkably improved.

What is claimed is:

1. A cutting apparatus for simultaneously cutting at least two identically shaped articles from a sheet of material, said cutting apparatus comprising:
   a supporting stand for supporting the sheet of material, the support stand having a longitudinal axis;
   a first travelling member and a second travelling member each disposed on said supporting stand and each movable in directions parallel to the longitudinal axis of the supporting stand, and means for operatively connecting said first travelling member to said second travelling member;
   at least one cutting tool disposed on said first travelling member for entirely cutting one of the at least two identically shaped articles and at least one cutting tool disposed on said second travelling member for entirely cutting another of the at least two identically shaped articles, each said at least one cutting tool movable in directions along their respective travelling members that are perpendicular to the longitudinal axis of the supporting stand;
   and means for moving said first travelling member and said second travelling member operatively connected to each other toward and away from each other in said directions parallel to the longitudinal axis of the supporting stand, and for moving each said at least one cutting tool disposed on the first travelling member and said at least one cutting tool disposed on the second travelling member in a laterally symmetrical relation to one another in said directions that are perpendicular to the longitudinal axis of the supporting stand to cut the at least two identically shaped articles from the sheet of material.

2. A cutting apparatus as claimed in claim 1, wherein said means for moving includes a control means comprising a numerical control device.

3. A cutting apparatus as claimed in claim 1, wherein said supporting stand has guide rails extending in a direction parallel to the longitudinal axis, said first and said second travelling members each comprise a frame movable along and guided by said guide rails, each said frame having a nut member, and said means for operatively connecting said first travelling member to said second travelling member comprises a screw means disposed below the supporting stand threaded to the nut member of each said frame, and a motor for rotating said screw means.

4. A cutting apparatus as claimed in claim 3, wherein said screw means comprises a first screw extending through said travelling members and threaded only to the nut member of the frame of said first travelling member, a second screw extending through said travelling members threaded only to the nut member of the frame of said second travelling member and means for causing said first and said second screws to rotate in opposite rotational directions to one another when said motor is operated.

5. A cutting apparatus as claimed in claim 1, wherein each of said travelling members comprise a respective frame having a horizontal member extending in a direction perpendicular to the longitudinal axis of the supporting stand, rails extending along the horizontal member, a screw disposed on the horizontal member and extending parallel to said rails, a travelling stand to which respective ones of the cutting tools are mounted, said travelling stand engaging the rails and guided therealong and having a nut member threaded to said screw, and a motor means for rotating said screw to translate said travelling stand along said rails.

6. A cutting apparatus as claimed in claim 1, wherein said at least one respective cutting tool disposed on each of said travelling members comprises a plurality of cutting tools.

* * * * *